United States Patent
Zhang et al.

(10) Patent No.: US 8,702,562 B2
(45) Date of Patent: Apr. 22, 2014

(54) SYSTEM AND METHOD FOR CONTROLLING AN AUTOMATIC ENGINE STOP-START BASED ON TRANSMISSION CONDITIONS

(75) Inventors: Zhen J. Zhang, Canton, MI (US); Casie M. Bockenstette, Clarkston, MI (US); Paul G. Otanez, Troy, MI (US); Shushan Bai, Ann Arbor, MI (US)

(73) Assignee: GM Global Technology Operations, Detroit, MI (US)

( * ) Notice: Subject to any disclaimer, the term of this patent is extended or adjusted under 35 U.S.C. 154(b) by 412 days.

(21) Appl. No.: 13/228,658

(22) Filed: Sep. 9, 2011

(65) Prior Publication Data

US 2012/0088631 A1    Apr. 12, 2012

Related U.S. Application Data

(60) Provisional application No. 61/391,902, filed on Oct. 11, 2010.

(51) Int. Cl.
*F16H 61/38* (2006.01)

(52) U.S. Cl.
USPC .......................................................... 477/52

(58) Field of Classification Search
None
See application file for complete search history.

(56) References Cited

U.S. PATENT DOCUMENTS

| | | | |
|---|---|---|---|
| 6,913,558 B2 * | 7/2005 | Mori et al. | 477/3 |
| 7,694,764 B2 * | 4/2010 | Sasaki | 180/65.285 |
| 8,050,851 B2 * | 11/2011 | Aoki et al. | 701/112 |
| 2010/0056326 A1 * | 3/2010 | Kahn et al. | 477/3 |
| 2010/0311538 A1 * | 12/2010 | Miyabe et al. | 477/2 |

* cited by examiner

*Primary Examiner* — Erin D Bishop

(57) ABSTRACT

A system and method for controlling automatic stop-start of a motor vehicle is provided. The system and method is configured to disable an automatic stop-start mode of operation based on accumulator pressure conditions.

18 Claims, 3 Drawing Sheets

SYSTEM AND METHOD FOR CONTROLLING AN AUTOMATIC ENGINE STOP-START BASED ON TRANSMISSION CONDITIONS

CROSS-REFERENCE

This application claims the benefit of U.S. Provisional Application No. 61/391,902, filed Oct. 11, 2010. The entire contents of the above application are incorporated herein by reference.

FIELD

The present disclosure relates to a system and method for controlling an automatic engine stop-start, and more particularly to a system and method for controlling an automatic engine stop-start using measured transmission conditions and an accumulator.

BACKGROUND

The statements in this section merely provide background information related to the present disclosure and may or may not constitute prior art.

A typical automatic transmission includes a hydraulic control system that, among other functions, is employed to actuate a plurality of torque transmitting devices. These torque transmitting devices may be, for example, friction clutches and brakes. The conventional hydraulic control system typically includes a main pump that provides a pressurized fluid, such as oil, to a plurality of valves and solenoids within a valve body. The main pump is driven by the engine of the motor vehicle. The valves and solenoids are operable to direct the pressurized hydraulic fluid through a hydraulic fluid circuit to the plurality of torque transmitting devices within the transmission. The pressurized hydraulic fluid delivered to the torque transmitting devices is used to engage or disengage the devices in order to obtain different gear ratios.

In order to increase the fuel economy of motor vehicles, it is desirable to stop the engine during certain circumstances, such as when stopped at a red light or idling. However, during this automatic stop, the pump is no longer driven by the engine. Accordingly, hydraulic fluid pressure within the hydraulic control system drops. This leads to clutches and/or brakes within the transmission to be fully disengaged. As the engine restarts, these clutches and/or brakes may take time to reengage fully, thereby producing slippage and delay between engagement of the accelerator pedal or release of the brake and the movement of the motor vehicle. Additionally, there are conditions where automatically shutting off the engine is not desirable, such as during brief stops or idling while still moving.

Therefore, there is a need in the art for a system and method for controlling automatic engine stop-starts based on motor vehicle operating conditions as well as providing controllability of the motor vehicle during engine restart.

SUMMARY

A system and method for controlling automatic stop-start of a motor vehicle is provided. The system and method is configured to enable an automatic stop-start mode of operation based on transmission conditions. In addition, the system and method is configured to selectively actuate an accumulator to prime the transmission for a smooth restart.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
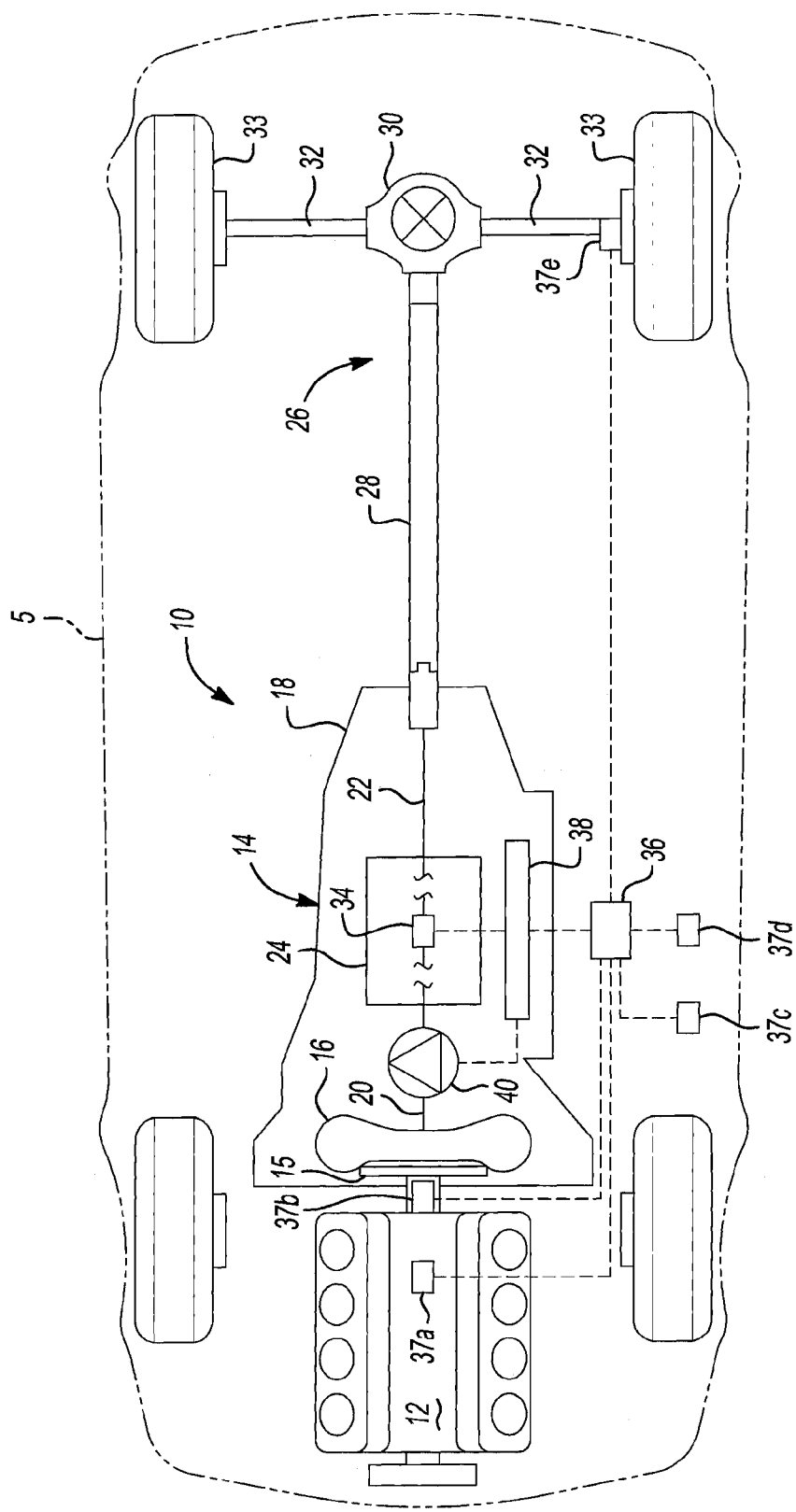
FIG. 1 is a schematic diagram of an exemplary powertrain in a motor vehicle.

With reference to FIG. 1, a motor vehicle is shown and generally indicated by reference number 5. The motor vehicle 5 is illustrated as a passenger car, but it should be appreciated that the motor vehicle 5 may be any type of vehicle, such as a truck, van, etc. The motor vehicle 5 includes an exemplary powertrain 10. It should be appreciated at the outset that while a rear-wheel drive powertrain has been illustrated, the motor vehicle 5 may have a front-wheel drive powertrain without departing from the scope of the present invention. The powertrain 10 generally includes an engine 12 interconnected with a transmission 14.

The engine 12 may be a conventional internal combustion engine or an electric engine, or any other type of prime mover, without departing from the scope of the present disclosure. The engine 12 supplies a driving torque to the transmission 14 through a flexplate 15 or other connecting device that is connected to a starting device 16. The starter device 16 may be a hydrodynamic device, such as a fluid coupling or torque converter, a wet dual clutch, or an electric motor. It should be appreciated that any starting device between the engine 12 and the transmission 14 may be employed.

The transmission 14 includes a typically cast, metal housing 18 which encloses and protects the various components of the transmission 14. The housing 18 includes a variety of apertures, passageways, shoulders and flanges which position and support these components. Generally speaking, the transmission 14 includes a transmission input shaft 20 and a transmission output shaft 22. Disposed between the transmission input shaft 20 and the transmission output shaft 22 is a gear and clutch arrangement 24. The transmission input shaft 20 is functionally interconnected with the engine 12 via the starting device 16 and receives input torque or power from the engine 12. Accordingly, the transmission input shaft 20 may be a turbine shaft in the case where the starting device 16 is a hydrodynamic device, dual input shafts where the starting device 16 is dual clutch, or a drive shaft where the starting device 16 is an electric motor. The transmission output shaft 22 is preferably connected with a final drive unit 26 which includes, for example, propshaft 28, differential assembly 30, and drive axles 32 connected to wheels 33. The transmission input shaft 20 is coupled to and provides drive torque to the gear and clutch arrangement 24.

The gear and clutch arrangement 24 includes a plurality of gear sets, a plurality of clutches and/or brakes, and a plurality of shafts. The plurality of gear sets may include individual intermeshing gears, such as planetary gear sets, that are connected to or selectively connectable to the plurality of shafts through the selective actuation of the plurality of clutches/brakes. The plurality of shafts may include layshafts or countershafts, sleeve and center shafts, reverse or idle shafts, or combinations thereof. The clutches/brakes, indicated schematically by reference number 34, are selectively engageable to initiate at least one of a plurality of gear or speed ratios by selectively coupling individual gears within the plurality of gear sets to the plurality of shafts. It should be appreciated that the specific arrangement and number of the gear sets, clutches/brakes 34, and shafts within the transmission 14 may vary without departing from the scope of the present disclosure.

The motor vehicle 5 includes a control module 36. The control module 36 may be a transmission control module, an engine control module, or a hybrid control module, or any other type of controller. The control module 36 is preferably an electronic control device having a preprogrammed digital computer or processor, control logic, memory used to store data, and at least one I/O peripheral. The control logic includes a plurality of logic routines for monitoring, manipulating, and generating data. The control module 36 controls the actuation of the clutches/brakes 34 via a hydraulic control system 38. The hydraulic control system 38 is operable to selectively engage the clutches/brakes 34 by selectively communicating a hydraulic fluid to the clutches/brakes 34 that engages the clutches/brakes 34. The control module 36 is also in communication with a plurality of sensors located throughout the motor vehicle 5. For example, the control module 36 communicates with engine speed and temperature sensors 37A and 37B, a brake pedal position sensor 37C, an ignition key sensor 37D, a vehicle speed sensor 37E, to name but a few.

Figure 2:
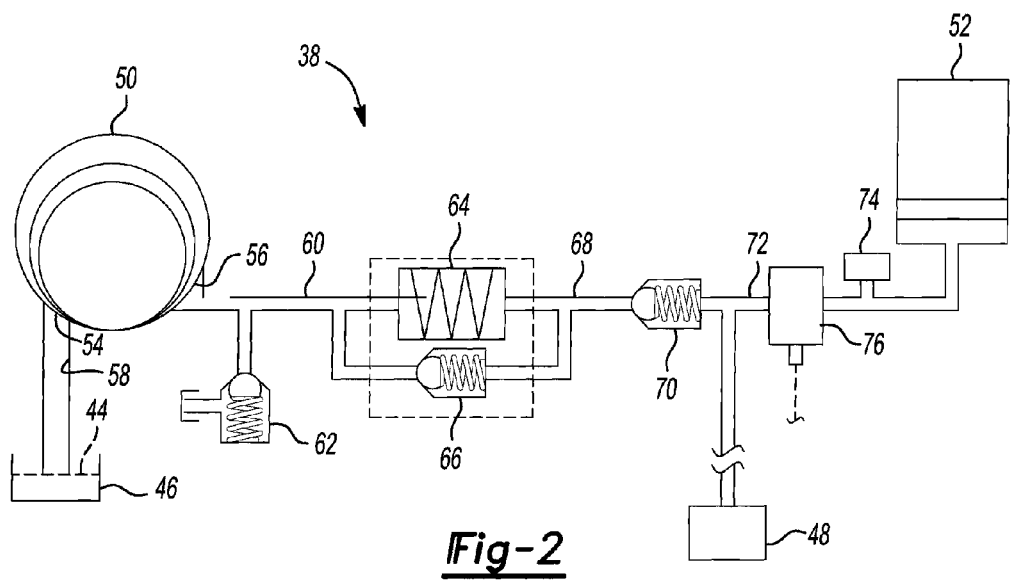
FIG. 2 is a schematic diagram of a portion of an exemplary hydraulic control system.

Turning to FIG. 2, a portion of the hydraulic control system 38 is illustrated. At the outset it should be appreciated that the portion of the hydraulic control system 38 shown in FIG. 2 is exemplary and that other configurations may be employed. The hydraulic control system 38 is operable to selectively engage the clutches/brakes 34 by selectively communicating a hydraulic fluid 44 from a sump 46 to a plurality of shift actuating devices 48. The hydraulic fluid 44 is communicated to the shift actuating devices 48 under pressure from either an engine driven pump 50 or an accumulator 52.

The sump 46 is a tank or reservoir to which the hydraulic fluid 44 returns and collects from various components and regions of the automatic transmission 14. The hydraulic fluid 44 is forced from the sump 46 and communicated throughout the hydraulic control system 38 via the pump 50. The pump 50 may be, for example, a gear pump, a vane pump, a gerotor pump, or any other positive displacement pump. The pump 50 includes an inlet port 54 and an outlet port 56. The inlet port 54 communicates with the sump 46 via a suction line 58. The outlet port 56 communicates pressurized hydraulic fluid 44 to a supply line 60. The supply line 60 is in communication with a spring biased blow-off safety valve 62, an optional pressure side filter 64, and an optional spring biased check valve 66. The spring biased blow-off safety valve 62 communicates with the sump 46. The spring biased blow-off safety valve 62 is set at a relatively high predetermined pressure and if the pressure of the hydraulic fluid 44 in the supply line 60 exceeds this pressure, the safety valve 62 opens momentarily to relieve and reduce the pressure of the hydraulic fluid 44. The pressure side filter 64 is disposed in parallel with the spring biased check valve 66. If the pressure side filter 64 becomes blocked or partially blocked, pressure within supply line 60 increases and opens the spring biased check valve 66 in order to allow the hydraulic fluid 44 to bypass the pressure side filter 64.

The pressure side filter 64 and the spring biased check valve 66 each communicate with an outlet line 68. The outlet line 68 is in communication with a second check valve 70. The second check valve 70 is in communication with a main supply line 72 and is configured to maintain hydraulic pressure within the main supply line 72. The main supply line 72 supplies pressurized hydraulic fluid to a control device 76. The control device 76 is electrically controlled by the control module 36 and is operable to control whether the accumulator 52 is charged or discharged. When the control device 76 is open, the accumulator 52 may discharge. When the control device 76 is closed, the accumulator 52 may charge and remain charged. The control device 76 may be an on/off solenoid or a pressure or flow control solenoid.

The main supply line 72 communicates through a hydraulic circuit that may include other control devices, valves, etc., to the plurality of actuating devices 48. The actuating devices 48 may be, for example, piston assemblies that when engaged in turn engage the clutches/brakes 34.

The control device 76 communicates with the accumulator 52 and a pressure sensor 74. The accumulator 52 is an energy storage device in which the non-compressible hydraulic fluid 44 is held under pressure by an external source. In the example provided, the accumulator 52 is a spring type or gas filled type accumulator having a spring or compressible gas or both that provides a compressive force on the hydraulic fluid 44 within the accumulator 52. However, it should be appreciated that the accumulator 52 may be of other types, such as a gas-charged type, without departing from the scope of the present invention. Accordingly, the accumulator 52 is operable to supply pressurized hydraulic fluid 44 back to the main supply line 72. However, upon discharge of the accumulator 52, the second check valve 70 prevents the pressurized hydraulic fluid 44 from returning to the pump 50. The accumulator 52, when charged, effectively replaces the pump 50 as the source of pressurized hydraulic fluid 44, thereby eliminating the need for the pump 50 to run continuously. The pressure sensor 74 reads the pressure of the hydraulic fluid 44 within the accumulator 52 or the main supply line 72 in real time and provides this data to the control module 36. Other types of sensors, such as volume or position sensors, may also be included.

Figure 3A:
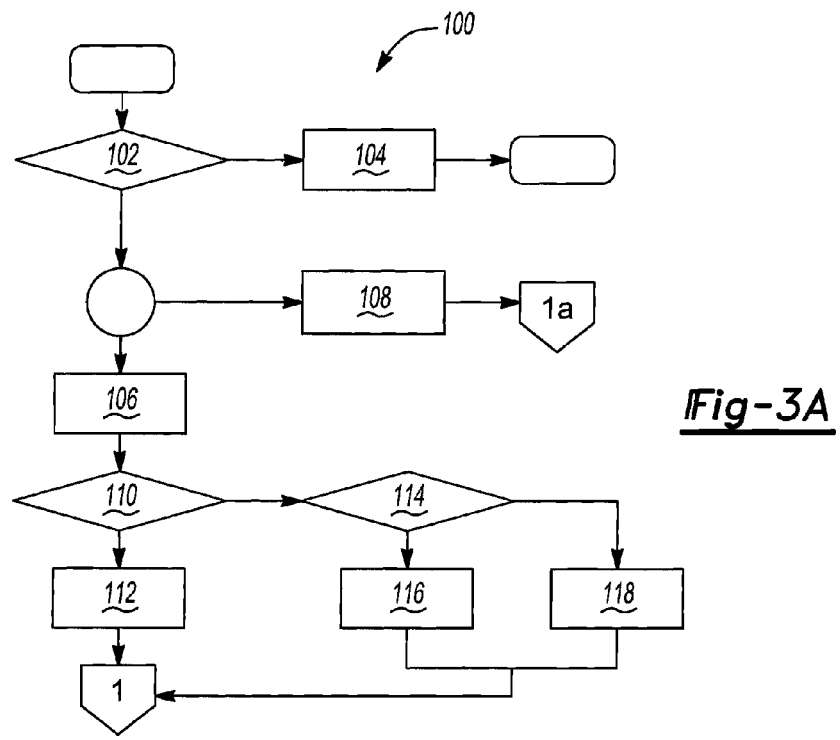
FIGS. 3A-3C is a flow chart illustrating a method of operating the motor vehicle of FIGS. 1-2 according to the principles of the present invention.
Figure 3C:
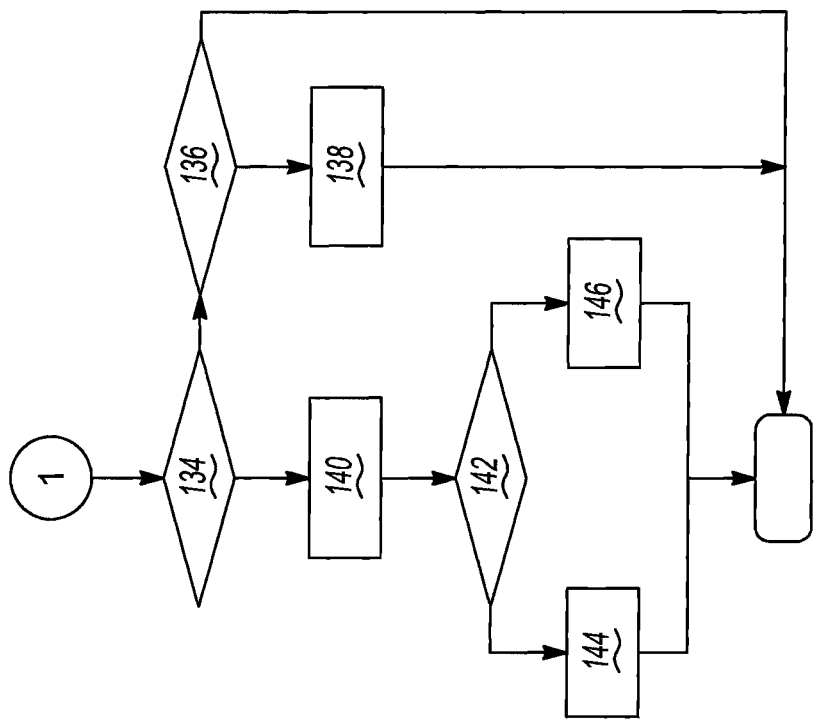
Figure 3B:
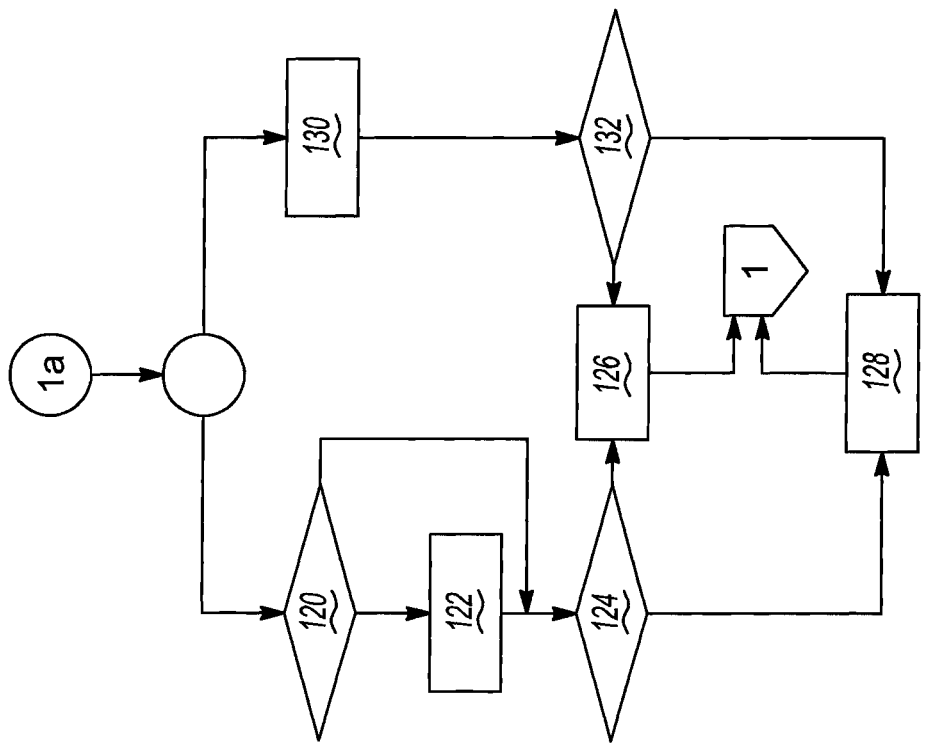

With reference to FIGS. 3A-C, and with continued reference to FIGS. 1 and 2, a method 100 for operating the motor vehicle 5 will now be described. The method 100 is configured to inhibit an automatic stop-start mode of operation based on the state of the transmission 14 including the accumulator 52. For example, the method 100 begins at step 102 where the control module 36 determines whether the accumulator 52 is being used, whether the engine 12 is running, and whether the vehicle 5 is in an automatic stop state. If the accumulator 52 is not being used or the engine 12 is off or the vehicle 5 is in an automatic stop state, the method 100 proceeds to step 104. At step 104 a time of commanded line pressure high is set to zero and a time for accumulator to charge to a threshold value is and the method 100 ends. The time of commanded line pressure high is an amount of time that the hydraulic control system 38 is operating at a line pressure greater than a threshold value. The threshold value is predefined as an amount of pressure within the main line 72 sufficient to charge the accumulator 52.

If the accumulator 52 is being used, the engine 12 is running, and the vehicle 5 is not in an automatic stop-start state, the method proceeds to either step 106 where the determination whether to inhibit an automatic engine stop is determined by a subroutine that uses the pressure sensor 74, or step 108 where the determination whether to inhibit an automatic engine stop is determined by a subroutine that uses a commanded line pressure to estimate a pressure of the accumulator 52. The commanded line pressure is the pressure commanded by the control module 36 of the hydraulic fluid 44 within the main supply line 72.

Step 106 proceeds to step 110 where the control module 36 receives data from the pressure sensor 74 that is indicative of the pressure within the accumulator 52. The control module 36 then compares the measured or sensed pressure of the accumulator 52 to a threshold value. The threshold value is the minimum amount of pressure needed to prime or fill the circuits of the hydraulic control system 38 in order to ready the clutches/brakes 34. If the measured pressure of the accumulator 52 is larger than the threshold value, then the method 100 proceeds to step 112 and the automatic stop of the engine 12 is not inhibited. If the measured pressure of the accumulator 52 is less than the threshold value, the method proceeds to step 114 where the control module 36 compares the measured pressure of the accumulator 52 to the threshold value plus a hysteresis value. The hysteresis value is a negative value which will create a band for the pressure threshold to prevent the toggling of inhibit/not inhibit based on the pressure comparison. If the measured pressure of the accumulator 52 is less than the threshold value plus the hysteresis value, then the method 100 proceeds to step 116 and the automatic engine stop is inhibited. If the measured pressure of the accumulator 52 is not less than the threshold value plus the hysteresis value, then the method 100 proceeds to step 118 and the automatic engine stop is not inhibited.

Alternatively, when there is no pressure sensor available, the pressure in the accumulator has to be estimated based on the commanded line pressure. If the method proceeds to step 108 instead of step 106, then one of two options is available to determine whether to inhibit the automatic engine stop based on a commanded line pressure. At step 120 the control module 36 compares the commanded line pressure to a threshold value. The threshold value is a pressure value sufficient to charge the accumulator 52. If the commanded line pressure is larger than the threshold, then the commanded line pressure is sufficient to charge the accumulator and the method proceeds to step 122. If, however, the commanded line pressure is less than the threshold, then the method proceeds to step 124.

At step 122 the time of commanded line pressure high (i.e. the time for the commanded line pressure to reach an actual line pressure that exceeds the threshold described at step 122) is updated and the time for accumulator charge is calculated based on the commanded line pressure and a temperature of the hydraulic fluid 44. The method then proceeds to step 124.

At step 124, the time of commanded line pressure high is compared to the time for accumulator charge. If the time of commanded line pressure high is larger than the time for accumulator full charge, then the method proceeds to step 128 and the automatic engine stop is not inhibited based on the estimated pressure within the accumulator 52 since the accumulator 52 is charged. If the time of commanded line pressure high is not larger than the time for accumulator charge, then the method proceeds to step 126 and the automatic engine stop is inhibited based on the estimated pressure within the accumulator 52 since the accumulator 52 has not exceeded the threshold.

Alternatively, the method may proceed from step 108 to step 130 where the accumulator pressure is calculated using a first principles model as a function of a pressure difference between the commanded line pressure and an estimated accumulator pressure. At step 132 the calculated accumulator pressure is then compared to a threshold value. The threshold value is the minimum amount of accumulator 52 pressure needed to prime the hydraulic system 38, as described above. If the calculated accumulator pressure is less than the threshold value, then the method proceeds to step 126 and the automatic engine stop is inhibited based on the calculated pressure within the accumulator 52. If the calculated accumulator pressure is greater than the threshold value, then the method proceeds to step 128 and the automatic engine stop is not inhibited based on the calculated pressure within the accumulator 52.

Both of the methods of determining whether to inhibit an automatic engine stop described in subroutines 106 and 108 proceed at their conclusion to step 134. At step 134, the control module 36 determines whether the automatic engine stop was inhibited based on the accumulator pressure at steps 116 or 126. If the automatic stop was inhibited, the method 100 proceeds to step 136 where the control module 36 determines whether the transmission 14 is operating at a steady state. If the transmission 14 is not operating at a steady state, the method 100 ends. If the transmission 14 is operating at a steady state, the method proceeds to step 138 where line pressure from the pump 50 is boosted in order to charge the accumulator 52 and the method ends.

If the automatic engine stop was not inhibited, the method proceeds to step 140 where the control module 36 calculates an engine run time threshold based on the engine speed and engine temperature detected by sensors 37B and 37A, respectively. The engine run time is the length of time that the engine 12 has been operating, for example after a restart from an automatic engine stop. At step 142 the control module 36 compares the engine run time to an engine run time threshold. The engine run time threshold is the minimum amount of time that the engine 12 should run to provide sufficient line pressure in the hydraulic control system 38 for normal operations. If the engine run time is larger than the calculated engine run time threshold, the method proceeds to step 144 and the automatic engine stop is not inhibited and the method 100 ends. If the engine run time is not larger than the calculated engine run time threshold, the method proceeds to step 146 and the automatic engine stop is inhibited and the method 100 ends.

The description of the invention is merely exemplary in nature and variations that do not depart from the gist of the invention are intended to be within the scope of the invention. Such variations are not to be regarded as a departure from the spirit and scope of the invention The following is claimed:
1. A method for controlling a powertrain in a motor vehicle, the powertrain having an engine and a transmission with an accumulator, the method comprising:
   determining a pressure of a fluid in the accumulator;
   comparing the pressure to a first pressure threshold;
   inhibiting the engine from shutting off if the pressure pressure is less than the first threshold;
   sensing an engine operating time;
   comparing the engine operating time to an engine operating time threshold, wherein the engine operating time threshold is a function of an output speed of the engine and a temperature of the engine; and inhibiting the engine from shutting off if the engine operating time is less than the engine operating time threshold.

2. The method of claim 1 wherein the step of determining the pressure in the accumulator includes sensing the pressure of the fluid in the accumulator using a sensor in communication with the fluid in the accumulator.

3. The method of claim 2 further comprising:
comparing the pressure to the first pressure threshold plus a hysteresis value after comparing the pressure to the first pressure threshold, wherein the hysteresis value is a negative value;
inhibiting the engine from shutting off if the pressure is less than the first pressure threshold plus the hysteresis value.

4. The method of claim 1 wherein the first pressure threshold is a minimum amount of pressure needed to ready the transmission to engage a forward or reverse gear.

5. The method of claim 1 wherein the step of determining the pressure in the accumulator includes:
comparing a commanded line pressure of a fluid in communication with the accumulator to a second pressure threshold;
calculating a time value that the commanded line pressure in communication with the accumulator has been larger than the second pressure threshold if the commanded line pressure is larger than the second pressure threshold;
increasing the commanded line pressure to a higher commanded line pressure that is greater than the second pressure threshold if the commanded line pressure is less than the second pressure threshold;
calculating a time value for the actual line pressure in communication with the accumulator to reach the higher commanded line pressure if the commanded line pressure is less than the second pressure threshold;
calculating a time for the accumulator to reach an operational charge based on the commanded line pressure and a temperature of the hydraulic fluid;
comparing the time value that the commanded line pressure in communication with the accumulator has been larger than the second pressure threshold; and
inhibiting the engine from shutting off if the calculated time value that the commanded line pressure has been larger than the second pressure threshold is less than the time value for the accumulator to reach the operational charge.

6. The method of claim 5 wherein the second pressure threshold is a pressure value of the fluid in communication with the accumulator sufficient to charge the accumulator to the operational charge.

7. The method of claim 1 wherein the step of determining the pressure in the accumulator includes calculating an estimated accumulator pressure as a function of a pressure difference between a commanded line pressure in communication with the accumulator and the estimated accumulator pressure using a first principles model.

8. The method of claim 1 wherein the engine run time threshold is a minimum amount of time that the engine should run to provide sufficient line pressure in the transmission for normal driving operations.

9. The method of claim 1 further comprising:
determining whether the transmission is operating at a steady state if the engine was inhibited from shutting off based on the pressure of the fluid in the accumulator; and
increasing a commanded line pressure in communication with the accumulator in order to charge the accumulator if the transmission is operating at the steady state.

10. A method for controlling a powertrain in a motor vehicle, the powertrain having an engine and a transmission with an accumulator, the method comprising:
determining a pressure of a fluid in the accumulator;
comparing the pressure to a first threshold;
inhibiting the engine from shutting off if the pressure is less than the first threshold;
comparing the pressure to the first threshold plus a hysteresis value, wherein the hysteresis value is a negative value;
inhibiting the engine from shutting off if the pressure is less than the first threshold plus the hysteresis value;
determining the operating time of the engine;
calculating an engine operating time threshold based on a speed of the engine and a temperature of the engine;
comparing the operating time of the engine to the engine operating time threshold; and
inhibiting the engine from shutting off if the operating time of the engine is less than the engine operating time threshold.

11. The method of claim 10 wherein the first threshold is a minimum amount of pressure needed to ready the transmission to engage a forward or reverse gear.

12. The method of claim 10 wherein the first threshold is a predetermined amount of pressure needed to ready the transmission to engage a forward or reverse gear.

13. The method of claim 10 wherein the engine operating time threshold is a minimum amount of time that the engine should run to provide sufficient line pressure in the transmission for normal driving operations.

14. The method of claim 10 further comprising:
determining whether the transmission is operating at a steady state if the engine was inhibited from shutting off based on the pressure of the fluid in the accumulator; and
increasing a commanded line pressure of a fluid in communication with the accumulator in order to charge the accumulator if the transmission is operating at the steady state.

15. A method for controlling a powertrain in a motor vehicle when the motor vehicle is in a stop state and an ignition is on, the powertrain having a transmission with an accumulator and an engine, the method comprising:
comparing a commanded line pressure in communication with the accumulator to a threshold;
calculating a time value that the commanded line pressure in communication with the accumulator has been larger than the threshold if the commanded line pressure is larger than the threshold;
increasing the commanded line pressure to a higher commanded line pressure that is greater than the threshold if the commanded line pressure is less than the threshold;
calculating a time value for the actual line pressure in communication with the accumulator to reach the higher commanded line pressure if the commanded line pressure is less than the threshold;
calculating a time value for the accumulator to reach a full charge based on the commanded line pressure and a temperature of the hydraulic fluid;
comparing the time value that the commanded line pressure in communication with the accumulator has been larger than the threshold; and
inhibiting the engine from shutting off if the time value that the commanded line pressure has been larger than the threshold is less than the time value for the accumulator to reach the full charge;
determining how long the engine has been running;

calculating an engine run time threshold based on a speed of the engine and a temperature of the engine;

comparing the time that the engine has been running to the engine run time threshold;

inhibiting the engine from shutting off if the time that the engine has been running is less than the engine run time threshold.

16. The method of claim 15 wherein the threshold value is a pressure value sufficient to charge the accumulator to an operational level.

17. The method of claim 15 wherein the engine run time threshold is a minimum amount of time that the engine should run to provide sufficient line pressure in the transmission for normal driving operations.

18. The method of claim 15 further comprising:

determining whether the transmission is operating at a steady state if the engine was inhibited from shutting off based on the pressure of the fluid in the accumulator; and increasing a commanded line pressure in communication with the accumulator in order to charge the accumulator if the transmission is operating at the steady state.

* * * * *